Sept. 15, 1959　　　　　　J. L. FROLOW　　　　　　2,903,881
TIMING APPARATUS
Original Filed Oct. 24, 1949　　　　　　　　　　　8 Sheets-Sheet 1
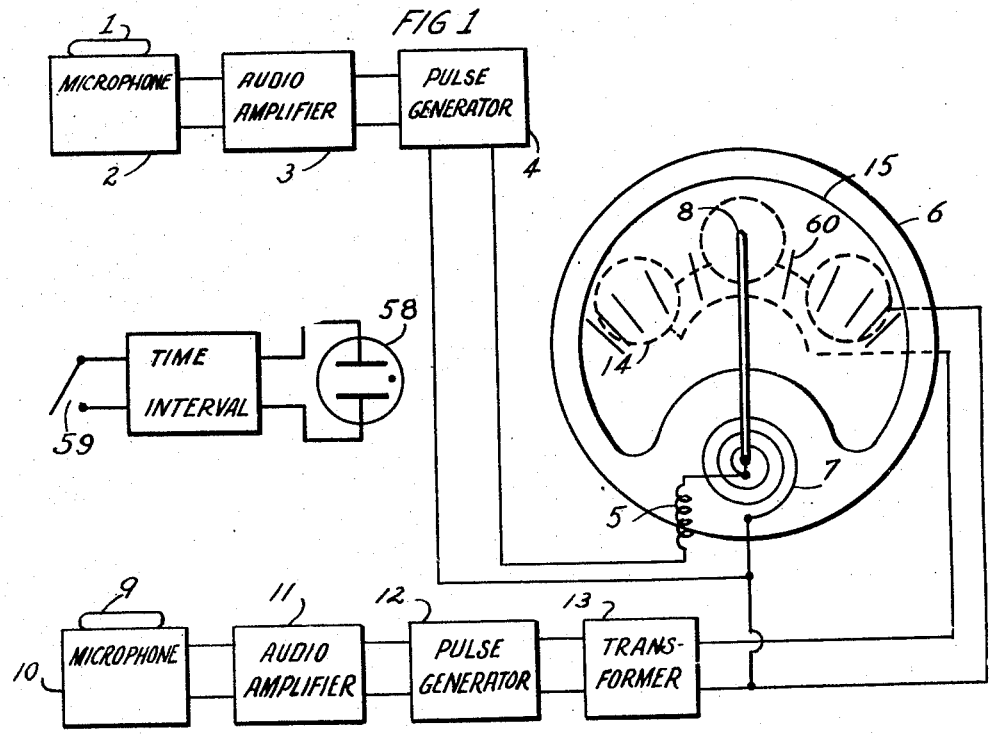
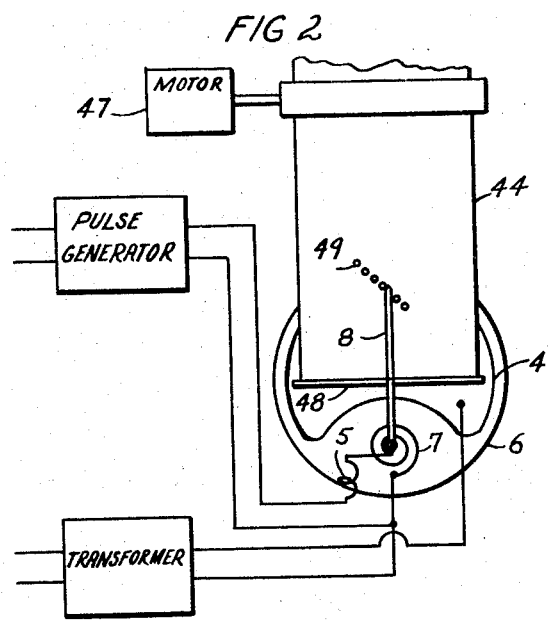
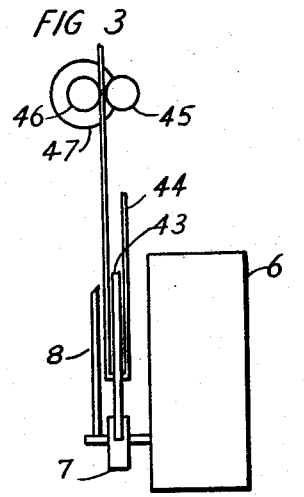
Inventor
Jack L. Frolow

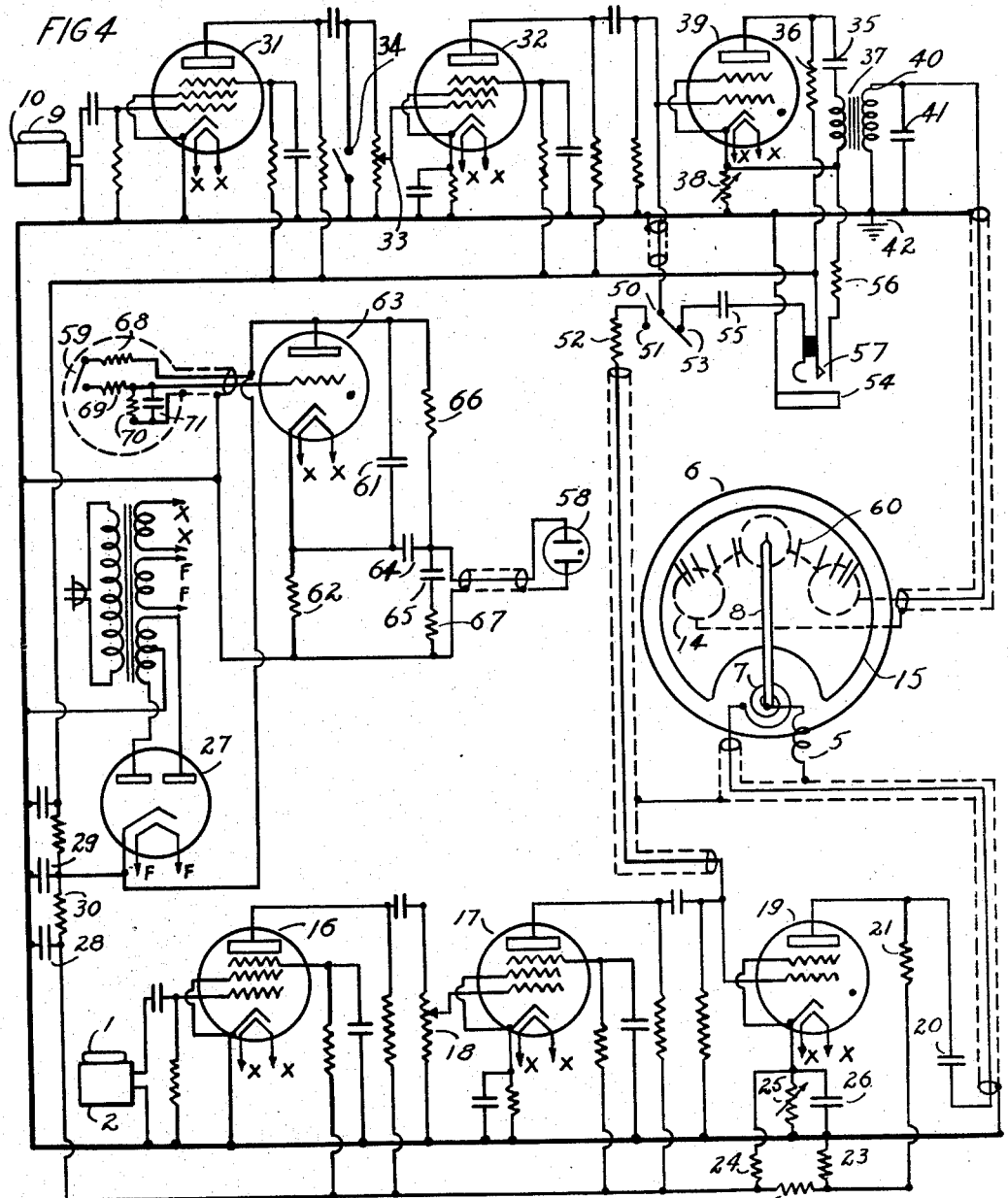

Sept. 15, 1959 J. L. FROLOW 2,903,881
TIMING APPARATUS
Original Filed Oct. 24, 1949 8 Sheets-Sheet 3

Inventor
Jack L. Frolow

Sept. 15, 1959  J. L. FROLOW  2,903,881
TIMING APPARATUS

Original Filed Oct. 24, 1949  8 Sheets-Sheet 4

Inventor
Jack L. Frolow

Sept. 15, 1959  J. L. FROLOW  2,903,881
TIMING APPARATUS
Original Filed Oct. 24, 1949  8 Sheets-Sheet 5

Inventor
Jack L. Frolow

Sept. 15, 1959                  J. L. FROLOW                    2,903,881
                               TIMING APPARATUS
Original Filed Oct. 24, 1949                              8 Sheets-Sheet 6

Inventor
Jack L. Frolow

Sept. 15, 1959   J. L. FROLOW   2,903,881
TIMING APPARATUS

Original Filed Oct. 24, 1949   8 Sheets-Sheet 7

Inventor
Jack L. Frolow

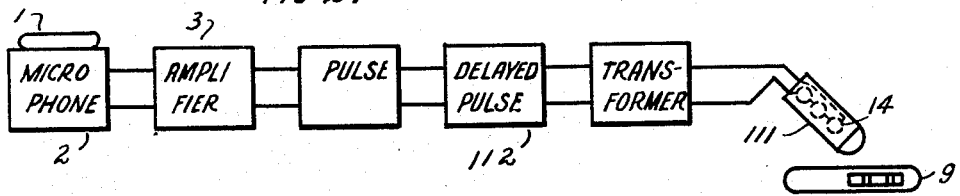
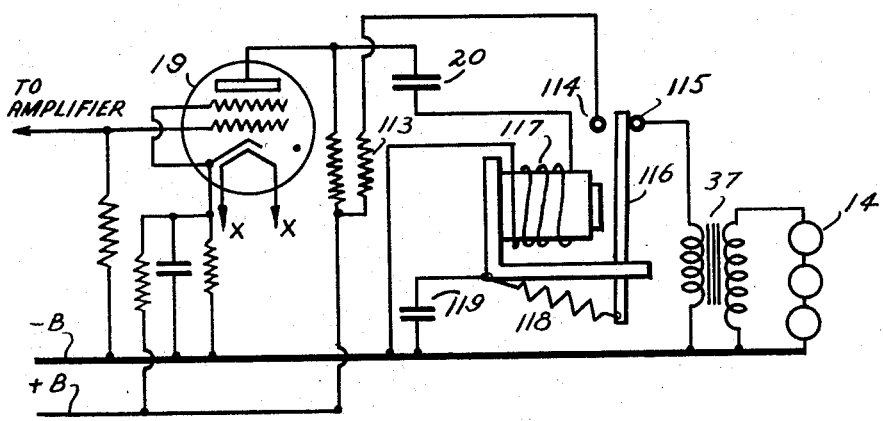

United States Patent Office 2,903,881
Patented Sept. 15, 1959

2,903,881

TIMING APPARATUS

Jack L. Frolow, Atlantic City, N.J.

Original application October 24, 1949, Serial No. 123,295, now Patent No. 2,712,231, dated July 5, 1955. Divided and this application June 27, 1955, Serial No. 546,497

8 Claims. (Cl. 73—6)

This invention relates to a means for comparing accurately in a short period of time the timing of a watch with that of a time standard.

There are a number of devices in existence now which accomplish this but they are expensive and complicated. One of the objects of this invention is to provide an inexpensive device, simple to operate, which will indicate the rate of a time piece and any irregularities in its operation. Another object of the present invention provides that the frequency of an oscillating member will be exactly that of a standard time device and be controlled by the standard time device, thus becoming the reference member of timing devices.

This application is a division of my copending application Serial No. 123,295, filed October 24, 1949, now Patent No. 2,712,231, issued July 5, 1955.

The nature and other objects of this invention will be better understood from the following explanations and diagrams illustrating various embodiments of the invention.

In the drawings Fig. 1 is a diagrammatic plan of an apparatus embodying the invention.

Fig. 2 illustrates a means for making a record on a strip of paper.

Fig. 3 is a side view of Fig. 2.

Fig. 4 is a circuit diagram for the apparatus illustrated in Fig. 1.

Fig. 27 is a diagram for another embodiment of the invention.

Fig. 28 is an electrical circuit diagram for a portion of the embodiment shown in Fig. 27.

Figure 5:
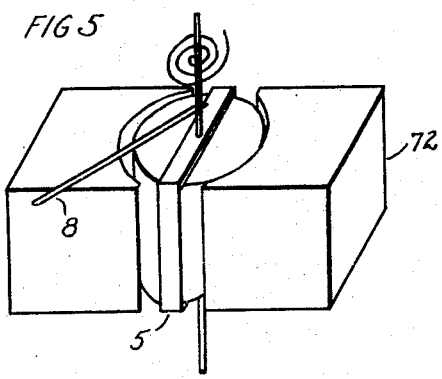
Fig. 5 is a perspective view of an oscillating system using a D'Arsonval type movement modified.

The apparatus shown in Fig. 1 operates in the following manner. A standard watch 1 is placed on a crystal contact microphone 2 which generates an electrical voltage corresponding to the ticks of the standard watch. This voltage is amplified in the audio amplifier 3 to a large voltage which triggers a thyratron tube of the pulse generator 4 giving a sharp pulse of current. The pulse generator is normally oscillating by itself at a frequency slightly lower than the ticks of the standard watch, and when the large audio voltage is applied to the grid of the thyratron tube it locks into exactly the frequency of the watch ticks. The uniform pulses of current are fed to the moving coil 5 of the indicator 6 which is a meter of the standard D'Arsonval type modified in the following manner. The hairspring 7 is chosen such that the natural or free period of oscillation of the pointer 8 and hairspring 7 is close to that of the standard watch ticks and all the damping effects are reduced.

The pointer 8 of this indicator will oscillate back and forth in exact synchronism with the ticks of the standard watch, even though its natural or free period is different from that of the standard watch. Moreover, this motion will be exactly the same each oscillation and be a very smooth sinusoid even though the standard watch ticks may have slightly different periods between successive ticks (the tick and the tock of a watch). The alternate ticks of the standard watch have a period which is the same each time and is the sum of the periods between these successive ticks. The indicator pointer will oscillate at ½ the period between alternate ticks.

The above statements are not readily apparent and an explanation will be given following the description of this embodiment.

The test watch 9 is placed on the crystal microphone 10 which generates an electrical impulse and it is fed to the amplifier 11 which triggers a pulse generator 12 which normally is oscillating at a frequency lower than that of the test watch and when the large audio voltage caused by the ticks of the test watch are applied to the grid of the thyratron tube, it locks into exactly the frequency of the test watch. The thyratron tube discharges a capacitor through the primary of a step up transformer 13. The voltage across the secondary is very high and of very short duration, and it flashes the neon bulbs 14. These flashes of the neon bulbs are in exact synchronism with the ticks of the test watch.

The neon bulbs are placed behind a translucent orange scale 15 of the indicator 6. The pointer 8 of the indicator is painted the same orange color as this scale and oscillates to and fro in front of this scale. When the neon bulbs are not flashing it is difficult to see this pointer, but when the bulbs flash the pointer appears as a black image.

If the two watches are in time this black image appears to be stationary on the meter scale 15. If the test watch is not in time with the standard watch 1 the image will drift back and forth across the meter scale like a metronome. The number of degrees the image drifts in a given time is a measure of how slow or fast the test watch is.

If the image drifts from the center of the scale to the end and returns to the center in one minute the watch is in error by 2.4 minutes per day. The accuracy obtainable is quite great since readings much less than ½ the scale can be observed. The example given is calculated as follows:

One half the scale and return per minute corresponds to ½ cycle per minute. This is the difference in timing between the two watches. In one day the difference would be 24 hours × 60 minutes × ½ cycle per minute which is 720 cycles per day. Since the pointer is oscillating at the rate of 5 cycles per second, 720 cycles per day corresponds to 720/5 seconds per day which is 144 seconds or 2.4 minutes per day.

A stop match can be used to measure the time for the image to drift ½ the scale. The error of the test watch will then be $2.4/t$ minutes per day; where $t$ is the time measured by the stop watch.

If the cycle is divided into ten divisions, and the number of divisions that the image drifts past in 28.8 seconds is noted, the error of the test watch is 30 seconds per day for each division. This can be shown as follows: The image drifts ½ cycle in 1 minute and it would therefore drift 10 divisions in 1 minute. It would drift 10 × 28.8/60 which is 4.8 divisions in 28.8 seconds. Thus a test watch with an error of 2.4 minutes a day would drift 4.8 divisions. Therefore each division corresponds to ½ minute.

A simple method of measuring the drift is provided by a neon bulb 58 in Fig. 1 which can be flashed at any time, by pressing the momentary push button switch 59, preferably when the image is passing a division mark 60 and which will flash of its own accord every 28.8 seconds thereafter. The number of divisions the image passes between the first and second flash is noted and each division corresponds to 30 seconds per day. If the drift is slow, the number of divisions the image passes between the first and third flashes of the neon bulb 58 is noted and each division then corresponds to 15 seconds per day. For four flashes, each division would correspond to 10 seconds per day.

If the neon bulbs 14 are suddenly allowed to flash at their normal slow rate, by short circuiting the voltage pulses caused by the test watch 9, the direction in which the pointer image moves at the time the shorting switch is closed, indicates whether the watch is fast or slow. If the image advances in the same direction the watch is slow, if it goes in the opposite direction it is fast.

The indicator is oscillating with a smooth identical motion each cycle (as will be explained). The successive tick and tock of the test watch will cause the neon bulbs to flash in synchronism with this tick and tock, thereby making the black image of the indicator pointer 8 jump back and forth with respect to the indicator scale 15. This indicates the "beat" of the watch and it is very useful information to the watch adjuster. Irregularities present in the watch are also easily identified with experience.

It is possible to make the pulse generators 4 and 12, controlled by the test watch 9 and the standard watch 1 respectively lock in with each successive tick of the watch, each alternate tick of the watch, or a multiple or sub-multiple of these watch ticks, by making the normal oscillating period of the generator be close to the desired sub-multiple or multiple of the watch ticks. For example; if the normal frequency of the generator 4 which is controlled by the standard watch 1, is made to be ½ that of the ticks of this watch, and the strength of the synchronizing voltages caused by the ticks of the watch are adjusted by an attenuator, the generator will lock in with every alternate tick of the watch.

If the indicator 6 is tuned close to the frequency of every alternate tick, it will lock in exactly with this frequency. If the neon lights 14 respond to every tick of the test watch, two images of the pointer will be seen ½ cycle apart.

It is also possible to select a hairspring 7 and pointer 8 of the indicator 6 to have a natural frequency close to twice or three times the frequency of the pulses of current being fed to the moving coil of the indicator. The indicator will lock in to exactly twice or three times this frequency and will oscillate smoothly.

The sensitivity of the instrument can be increased, thereby. For example; if the image drifts across ½ the scale 15 in a minute with the neon lights 14 flashing in synchronism with every tick of the test watch, the watch will be 1.2 minutes a day in error instead of 2.4 minutes as calculated before, since the pointer 8 is oscillating at 10 cycles per second.

There is a limit to the multiple of the pulses of current at which the indicator 6 can be tuned. Since the maximum amplitude of oscillation decreases in each cycle of oscillation, because of energy losses, this decrease may become appreciable in six or more cycles. As a result the maximum amplitude of oscillation would suddenly increase when a pulse of current passed through the indicator coil and then decrease appreciably before the next pulse arrived, thus giving an irregular motion.

Moreover, small differences or variations in time between successive pulses of current would correspond to large differences in the angle or position of the pointer 8 in its oscillation at which these pulses occurred, thereby, resulting in critical and irregular operation.

The electrical circuit is shown in Fig. 4 for the illustration in Fig. 1.

The standard watch is placed on the crystal microphone 2. The electrical voltage caused by the watch ticks is coupled to the grid of the pentode tube 16, a type 6SJ7 or 6AC7.

Tubes 16 and 17 are pentodes such as type 6SJ7 and are arranged to be a resistance coupled amplifier of the standard design. A volume control 18 is provided for adjustment of amplification. Tube 19 is a thyratron such as types 884, 885, 2050, or 2051. Capacitor 20 is 1 mf. and is charged through the resistor 21. Resistors 22 and 23 are voltage dividers to provide approximately twenty volts. Resistors 24 and 25 similarly provide bias voltage to the cathode of the thyratron tube. Capacitor 26 is a cathode by-pass. The constants of this circuit are chosen to make the tube 19 discharge slower than five times a second, the frequency of the watch ticks. When the amplified voltage controlled by the watch ticks are impressed on the grid of the tube 19, it locks in with this frequency. The capacitor 20 discharges through the moving coil 5 of the indicator 6. Tubes 16, 17, 19 receive their B+ voltage from the rectifier tube 27 through standard resistance capacitance filters 28, 29, 30.

The test watch 9 is placed on the crystal microphone 10 and the electrical voltage is amplified in the pentode tubes 31 and 32, a type 6AC7 and 6SJ7 respectively. A volume control 33 is provided to adjust the amplification. A momentary push button switch 34 is provided which can short circuit the amplified voltage caused by the watch ticks. Capacitor 35 is a 1 mf. capacitor and it is charged through resistor 36, the primary of the transformer 37, and resistor 38. Bias for the 2050 tube 39 is provided also by resistor 38. The value of the circuit elements are so chosen that the tube 39 oscillates at a frequency lower than five times per second. When the amplified voltage caused by the watch ticks are impressed on the grid of the tube 39 it locks in with this frequency. When the capacitor 35 discharges rapidly through the primary of the transformer 37 and the tube 39, a high voltage appears across the secondary 40. This voltage is fed across three neon bulbs 14 connected in series and it flashes them. Capacitor 41 by-passes any high RF voltages to ground.

The wires leading from the capacitors 41 and 20 to the indicator 6 are shielded and the chassis is grounded as shown at 42. The neon bulbs 14 also are shielded.

Capacitor 55 couples the headphone jack to the plate of tube 32 and resistor 56 provides additional bias to the cathode of tube 39 through contact 57 on the jack 54 to stop this tube from discharging.

The microphones 10 and 2 should be of small area so as not to pick up room noises. To this end also, the resistance coupled amplifier is designed to have low gain for low frequency by using small value coupling capacitors and cathode by-pass capacitors.

A time reference for measuring the drift of the pointer image is provided by the neon bulb 58 which can be flashed at any time by pressing the momentary switch 59. It will flash every 28.8 seconds thereafter. Capacitor 61 charges up through resistor 62. Thyratron tube 63 which is a type 884, receives cathode bias from the charging current of capacitor 61, flowing through resistor 62. Capacitor 61 is 1 mfd. and resistor 62 is chosen so that the tube 63 will discharge every 28.8 seconds. The circuit is so arranged that variations in the +B voltage will not change the period of discharge appreciably. When tube 63 discharges, a sharp pulse of voltage appears across resistor 62. This voltage is coupled by capacitor 64 to the neon bulb 58 and causes it to flash. Capacitor 65 is an electrolytic capacitor of 40 mfd. and it is charged from the +B through resistor 66. The value of this resistor is chosen so that the neon bulb 58 would flash with a period longer than 30 seconds and the large value of capacitor 65 causes the bulb to remain lighted for approximately 5 seconds when the bulb flashes, thereby permitting its observation to be made easily. The sharp pulses of voltage from resistor 62 are coupled to the neon bulb 58 and cause it to flash in synchronism with these pulses, and it remains bright for a few seconds while capacitor 65 discharges. Resistor 67 prevents the sharp pulse of voltage from being by-passed to ground by capacitor 65.

Thyratron tube 63 can be discharged at any time by pressing the momentary switch 59 and neon bulb 58 will flash. +B is applied through switch 59 and resistor 68 and 69 to the grid of tube 63. Resistors 68 and 69 and capacitor 71 are arranged in a filter network to prevent any high R.F. voltages from disturbing any other circuits. The switch and resistor assembly is shielded. Resistor 70 is a grid resistor for tube 63.

A printed record can be made by replacing the orange scale 15 with a metallic one 43 as shown in Figs. 2 and 3. The pointer 8 is placed at ground potential and the scale 43 is connected to the high side of the transformer secondary as shown in Fig. 2. The spacing between the tip of the pointer 8 and scale 43 is arranged to be the smallest distance between these two components and because of the high voltage a spark will jump the space. A sheet of paper 44 is inserted between the metal scale 43 and the pointer 8 so that the spark will go through it. The paper passes between two rollers 45 and 46 driven by a small motor 47 after passing from beneath the scale 43 through a slot 48 in the scale 43. The paper 44 is colored red, but is covered with a wax which makes it appear a light pink. When a spark passes through it, the wax melts and a small clear red spot 49 appears around the tiny hole that the spark makes in the paper. By observing the pattern that the spark makes on the paper with relation to the calibration marks on the paper, the number of seconds or minutes the watch is losing or gaining a day can be read.

Figure 6:
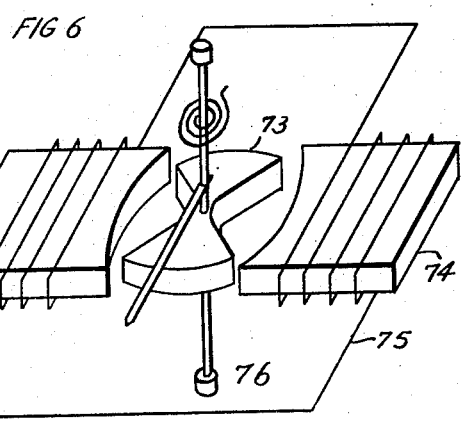
Figs. 6, 7, 8 and 9 are views of other types of oscillating systems.

The oscillating indicator 6 used in this embodiment with a D'Arsonval type as shown in Fig. 5 whereby mechanical impulses are applied to the pointer 8 by the reaction of the current pulse in the moving coil 5 with the permanent magnet poles 72. Other oscillating systems can be used. As shown in Fig. 6 a soft iron rotor 73 is attracted to the poles 74 when a pulse of current is sent through the coils 75. The oscillation is angular and the suspension consists of bearings 76 and a hairspring.

Figure 7:
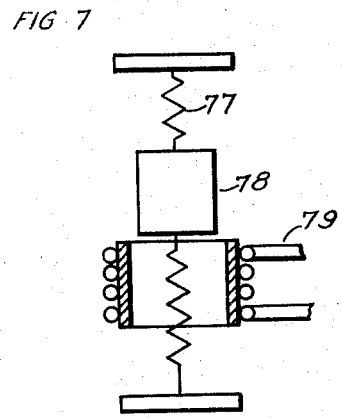

Fig. 7 illustrates a method whereby an iron mass 78, which may or may not be a permanent magnet, is attracted to the solenoid coil 79 when pulses of current are passed through the coil. The suspension is a helical spring 77.

Figure 8:
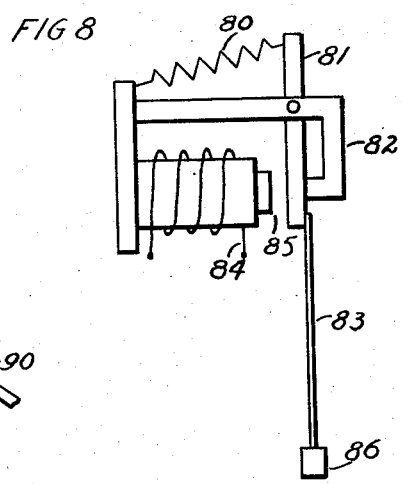

In Fig. 8 a leaf spring 83 with a weight 86 attached at one end is used. The weight 86 is given impulses by the spring 83 when the soft iron armature 81 of the relay is attracted to pole 85 when a pulse of current passes through the coil 84. When this current ceases the leaf spring 83 is given an impulse in the opposite direction when the armature 81 is returned quickly to the upper contact 82 by spring 80. However, the strength of spring 80 is adjusted to be just strong enough to keep the armature 81 against the contact 82 when the weight 86 is swinging back and forth. Because this spring 80 is weak the armature returns to the stop 82 much slower than when the armature is quickly attracted to the pole 85. Thus the net result of the two impulses is an effective impulse in one direction toward the pole 85, every time a pulse of current passes through the relay coil 84.

Figure 9:
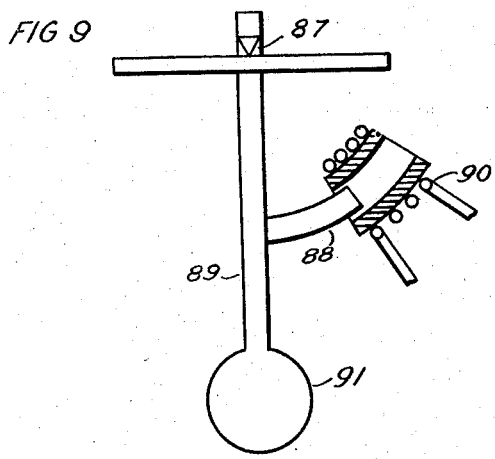

In Fig. 9 a pendulum consists of a weight 91 supported on a rigid bar 89 of suitable material. The bar 89 is supported on a knife edge 87. Attached to the bar is an armature made of soft iron or a permanent magnet 88. When pulses of current are passed through the solenoid coil 90, the armature 88 is given an impulse.

A great number of such systems can be designed as well as combinations of them. In all these mechanical systems the members will have a steady state motion which will be exactly that of the applied frequency, and can thus become the reference member of the embodiments described.

*Explanation of indicator motion*

Figure 10:
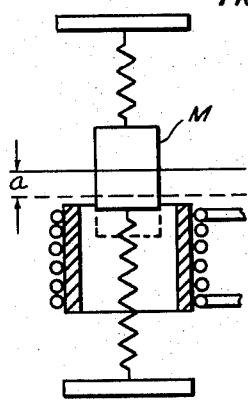
Fig. 10 is a diagram of a linear oscillating system.

The mechanical vibrating system used in the embodiment just described was an angular one. For purposes of explanation a linear one as shown in Fig. 10 will be used.

A list of symbols to be used in the following discussion are given below:

M—The mass of the body
$a$—The distance the body M is from its rest position at a time $t$
$t$—The time elapsed from when the body passes the rest position, or zero position, to the position, $a$, being considered
A—The maximum amplitude or distance the body M moves from its rest position
$v$—The velocity the body M has at a time, $t$
$\theta$—The angle in radians at which the body is positioned and is equal to $wt$
$da$—Incremental change in $a$
$dt$—Incremental change in $t$
$dA$—Incremental change in A
$dv$—Incremental change in $v$
$d\theta$—Incremental change in $\theta$ Assume the mass, M, is oscillating at its own natural free frequency. The equation of its motion is:

$$a = A \sin \theta$$

While in this motion the mass M is given an impulse; this impulse being a force in a direction such as to increase the maximum amplitude of swing, and of such short duration that the body M does not have sufficient time to move appreciably under the influence of this impulse due to the inertia of its mass.

Two things happen to the body M; first, a certain amount of energy is given to the system and second, the time it takes to complete its oscillation is shortened or lengthened.

The amount the period is changed by an impulse is mathematically shown as follows:

$$a = A \sin \theta$$

differentiating partially $$da = \frac{\partial}{\partial \theta}(A \sin \theta) d\theta + \frac{\partial}{\partial A}(A \sin \theta) dA$$

As mentioned before the duration of the force is so small that:

$$da = 0$$

Therefore:

$$da = 0 = A \cos \theta \, d\theta + \sin \theta \, dA$$

or $$d\theta = -\frac{dA}{A} \tan \theta$$

This is the change in the angle through which the body M is advanced or retarded in its motion. Since the body resumes its motion with the constant angular speed $w$, this change in angle represents the amount of time that the period is changed.

Thus $d\theta = w \, dt$ and $$w \, dt = -\frac{dA}{A} \tan \theta$$

$$dt = -\frac{dA}{wA} \tan \theta$$

Counting time as zero when the body M is passing through its rest position, it can be seen that:

(1) An impulse occurring as the body goes through the rest position does not change the period of oscillation, since $$dt = -\frac{dA}{wA} \tan 0° = 0$$

(2) An impulse occurring after the rest position lengthens the total period, since $$dt = -\frac{dA}{wA} \tan (+\theta) = -|dt|$$

A negative increment of time means that the body has been set back in its motion and must therefore proceed through it again, thereby lengthening the total period.

(3) An impulse occurring before the rest position shortens the total period, since $$dt = -\frac{dA}{wA} \tan (-\theta) = +|dt|$$

A positive increment of time means the body has been set ahead in its motion thereby reducing the total period.

The amount the amplitude A is changed by an impulse is shown mathematically as follows.
Returning to the original equation of motion:

$$a = A \sin \theta$$

differentiate $$\frac{da}{dt} = A \cos \theta \frac{d\theta}{dt}$$

Now $$\frac{da}{dt} = V$$

the velocity of M at the time $t$
Therefore, since $$\frac{d\theta}{dt} = w$$

$$V = A \cos \theta \frac{d\theta}{dt} = A (\cos \theta) w$$

differentiate partially $$dv = \frac{\partial}{\partial \theta}(Aw \cos \theta) d\theta + \frac{\partial}{\partial A}(Aw \cos \theta) dA$$

$$= -Aw \sin \theta \, d\theta + w \cos \theta \, dA$$

From our previous equation $$d\theta = -\frac{dA}{A} \tan \theta$$

Therefore $$dv = -Aw \sin \theta \left(-\frac{dA}{A} \tan \theta\right) + w \cos \theta \, dA$$

$$dv \cos \theta = +w \, dA \sin^2 \theta + w \, dA \cos^2 \theta$$

$$= w \, dA$$

$$dA = \frac{dv}{w} \cos \theta$$

Since $dv$, the impulse is of constant value, it can be seen that:

(1) $dA$ is a maximum at $\theta = 0$ and positive
(2) $dA$ is a minimum at $\theta = \pm 90°$
(3) $dA$ is negative at $\theta$ lying between 270° and 90°
(4) $dA$ is negative and a maximum when $wt = 180°$ The greatest amount that the period can be changed by an impulse is found mathematically as follows:
Returning to the equations $$dt = -\frac{dA}{wA} \tan \theta$$

and $$dA = \frac{dv}{w} \cos \theta$$

by substitution $$dt = -\frac{dv}{w^2 A} \cos \theta \tan \theta = -\frac{dv}{w^2 A} \sin \theta$$

Since $dv$ is of constant value, and the maximum value for $\sin wt$ is 1; the maximum value that $dt$, the change in the period of the oscillating body, can have from an impulse $dv$ is:

$$dt = -\frac{dv}{w^2 A}$$

and it occurs at $wt = \pm 90°$.

To determine mathematically the effect of the slight difference in period of the impulses, caused by the tick and tock of the watch, upon the motion of the oscillating body, we find the variation in the motion caused by this variation in period. Thus the equation $$dt = -\frac{dA}{wA} \tan \theta$$

is differentiated $$d(dt) = -\frac{dA}{wA} \sec^2 \theta \, d\theta$$

$$w \, d(dt) = -\frac{dA}{A} \sec^2 \theta \, d\theta$$

Since we have the system tuned so that $\theta$ is approximately 45° for satisfactory operation, and $$\Delta \theta = \frac{\pi}{16}$$

which corresponds to $\frac{1}{160}$ of a second difference between the tick and tock of the watch, we may write $$\Delta d\theta = -\frac{dA}{A} (\sec^2 45°) \frac{\pi}{16}$$

As will be shown later $$\frac{dA}{A} = \frac{0.7}{25}$$

Therefore $$\Delta d\theta = \left(\frac{0.7}{25}\right)\left(\frac{\pi}{16}\right)(2) = \frac{\pi}{237.5}$$

radians which is imperceptible.

Figure 11:
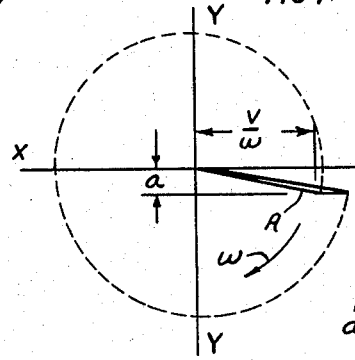
Fig. 11 is a chart associated with Fig. 10 to illustrate the motion in the latter figure.

These equations can also be shown graphically. Refer to Figs. 10 and 11.

The amplitude of motion of the body M at any time $t$, can be represented by the projection of the rotating line A on the axis y—y, and its velocity at this same time, $t$, by the projection of this line A on the axis x'—x'. The line A rotates with the angular velocity $w$, the natural free frequency of the mass M.

When an impulse $dv$, is given to the body M at the time, $t$, corresponding to the angle $\theta$, the distance, $a$, does not change, due to the inertia of the mass M.

The velocity of the body changes by an amount $dv$, and the body absorbs an amount of energy sufficient to change the maximum amplitude an amount $dA$.

After this impulse occurs the body resumes its natural vibration, but it has been retarded by the angle, $d\theta$, in its cycle, since the line A must proceed this angle again.

Figure 12:
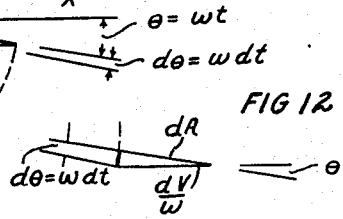
Fig. 12 is an enlarged view of a portion of Fig. 11.

The amount the period is changed by an impulse is shown graphically as follows:

From the Fig. 12 it can be seen that geometrically
$$A(-d\theta) = dA \tan \theta$$
$$-wA\,dt = dA \tan \theta$$

$$dt = -\frac{dA}{wA} \tan \theta$$

Figure 13:
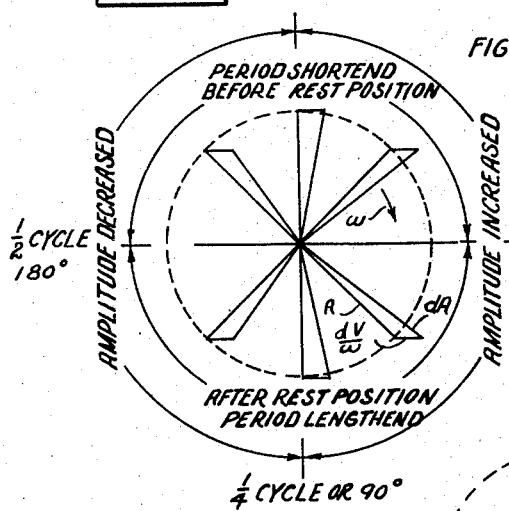
Fig. 13 is a chart illustrating the effect of impulses upon the motion of the body shown in Fig. 10.

From the diagram Fig. 13 we can conclude that:

(1) If the impulse occurs at the rest position the period of oscillation is not affected.

(2) If the impulse occurs before the rest position, the period is shortened.

(3) If the impulse occurs after the rest position, the period is lengthened.

(4) Both effects listed in 2 and 3 increase to a maximum value at ¼ cycle before and after the rest position, and then decrease if the impulse occurs more than ¼ cycle before and after the rest position; provided the maximum amplitude of oscillation remains the same. The amount the amplitude is changed by an impulse is found graphically as follows:

Referring to the geometry of the Fig. 12 again, we see that $$dA = \frac{dv}{w} \cos \theta$$

We can conclude from this and Fig. 13

(1) The increase in the maximum swing is greatest when the impulse occurs at the rest position.

(2) The magnitude of the increase in the maximum swing decreases if the impulse occurs before or after the mass M, passes through the rest position.

(3) It is zero if it occurs a quarter cycle before or after the rest position.

(4) It actually decreases the maximum swing if it occurs more than ¼ cycle before or after the rest position.

Figure 14:
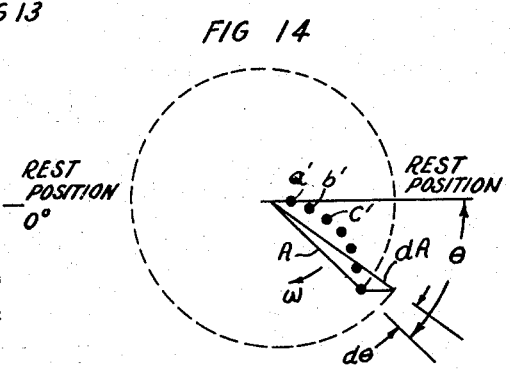
Fig. 14 is a chart illustrating how the motion of the body shown in Fig. 10 builds up from the rest position under the influences of impulses.

The manner in which the motion of the pointer builds up from the rest position under the influence of periodic impulses, is shown graphically as follows:

As shown in Fig. 14, when pulses of current are first fed to the system the first pulse occurs at the rest position. The body starts to swing. It returns to the rest position in a time T, after it makes a swing to one end of its travel and then to the other end and then back. If the pulses are a little slower, the body M swings a little further than its rest position before the next pulse occurs at $b'$ as shown in the Fig. 14. Since this pulse occurs after the body has passed its rest position, the period of oscillation is lengthened a small amount. The body also receives a small increase in amplitude of swing. Once again the pulse occurs a little later after the body has passed its rest position as shown at $c'$ and it will lengthen the period of oscillation a little more as well as increase the amplitude of swing a bit. The pulses keep occurring later and later in the cycle making the points of occurrence $a'$, $b'$, $c'$, etc. in the diagram progress in a clockwise direction, the same direction the body has when the pulse occurs.

If the pulses had been faster than period of the oscillating body, they would have occurred before the body made a complete cycle and the period of oscillation would have been shortened. The points of occurrence of the pulses would have have progressed in a counter clockwise direction.

The above processes continue until:

(1) The pulse occurs at an angle $\theta$, either before or after the rest position, such that the period of oscillation is either shortened or lengthened exactly enough so that it equals the period of the applied pulses.

(2) The amplitude of maximum swing continues to build up to such a value, that energy gained with each pulse is exactly dissipated during the rest of the cycle.

(3) If the difference between the period of the pulses and the period of the oscillating body is greater than the maximum amount the pulse can shorten or lengthen the period of the system when it occurs at ¼ cycle before or after the rest position, the oscillation of the body will not synchronize with the pulses. The pulses will continue to occur beyond the quarter cycle point and the motion will be decreased. The motion becomes small and complex, after first going through a number of phases in which the amplitude of swing will build up and then decrease.

Figure 15:
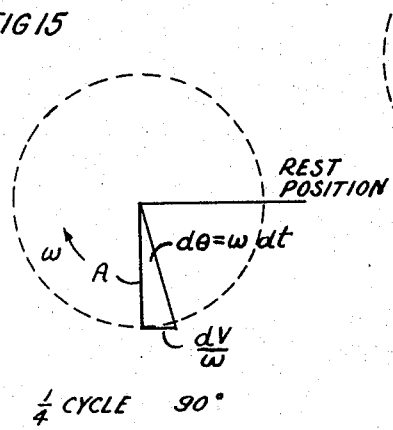
Fig. 15 is a chart illustrating the influence of an impulse upon the body shown in Fig. 10 when it occurs at a quarter cycle after the rest position.

Refer to Fig. 15 illustrating a pulse occurring at ¼ cycle after the rest position. From the geometry we see that $$\frac{dv}{w} = A\,d\theta = wA\,dt$$

or $$dt = \frac{dv}{w^2 A}$$

This is the greatest that the period of oscillation can be changed for a given value of $dv$ and A.

If the period of the impulses differs from that of the oscillating body by more than this, the impulse will occur later in the cycle than ¼ cycle and the point of occurrence will proceed past the 90° mark without the body M locking in synchronism with the applied pulses. Moreover, pulses which occur later than the ¼ cycle point decreases the amplitude A; and the oscillation will decrease rapidly. The point of occurrence of the pulses continues to progress clockwise until it occurs again at the rest position, only this time the value of A may or may not be zero. The oscillation will build up again and then decrease many times until a very small steady state amplitude exists, and the motion of the body M is complex.

The pointer can also be made to oscillate at an exact multiple of the periodic impulses. In the analysis given the system received an impulse every cycle and after equilibrium was established, the frequency of the pulses and the indicator were the same. If the system received an impulse every other cycle, the analysis to determine the amount the pulse changed the period, would be the same and the pulse would occur at the proper angle $\theta$ in the cycle to hasten or delay the swing of the system just enough so that it made exactly two swings between pulses. Thus the frequency of the indicator would be exactly twice that of the pulses.

This method can be extended so that the indicator can be tuned to lock in with higher multiples of the pulse frequency.

Figure 16:
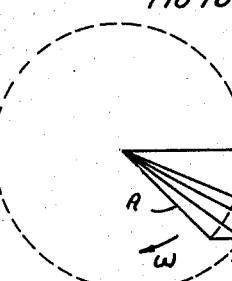
Fig. 16 illustrates the effect of impulses having slightly different periods upon the motion of the body shown in Fig. 10.

To determine graphically the effect of the slight difference in period of pulses caused by the tick and the tock of the standard watch, upon the motion of the oscillating body refer to Fig. 16.

Figure 16A:
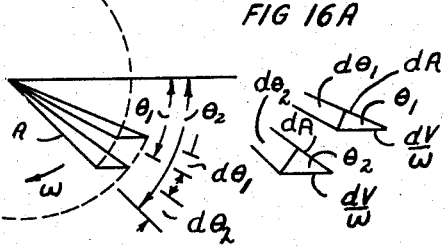
Fig. 16a is an enlarged view of a portion of Fig. 16.

Assume that the period of oscillation of the body M has been chosen such, that its period is lengthened exactly enough by an impulse caused by a tick of the standard watch, occurring at ⅛ cycle after the rest position that it equals the period of these impulses. This impulse will occur at $\theta_1$. If the next impulse caused by the tock of the watch occurs at $\theta_2$ as shown in the diagram it will lengthen the period of the oscillating body M by a little more time. To find how much more refer to the geometry of Fig. 16 and Fig. 16A.

$$d\theta_1 = -\frac{dA}{A} \tan \theta_1$$

$$d\theta_2 = -\frac{dA}{A} \tan \theta_2$$

$$d\theta_1 - d\theta_2 = -\frac{dA}{A}(\tan \theta_1 - \tan \theta_2)$$

Which may be written as:

$$d\theta_1 - d\theta_2 = -\frac{dA}{A}\left[\frac{\sin(\theta_1 - \theta_2)}{\cos \theta_1 \cos \theta_2}\right]$$

If the difference in $\theta_1$ and $\theta_2$ is $$\frac{\pi}{16}$$

which corresponds 1/160 of a second between the tick and tock we may write:

$$d\theta_1 - d\theta_2 = -\frac{dA}{A}\left[\frac{\sin \frac{\pi}{16}}{\cos^2 45°}\right]$$

$$= -\frac{dA}{A}\frac{\pi}{8}$$

The value of $dA/A$, as will be shown, for the indicator used, was found to be:

$$\frac{dA}{A} = \frac{0.7}{25}$$

Therefore $$\Delta d\theta = \left(\frac{0.7}{25}\right)\frac{\pi}{8} = \frac{\pi}{237.5}$$

radiants which is imperceptible.

The value of the term $dA/A$, the decrease in amplitude per cycle of the pointer caused by energy losses, can be found experimentally. Experiments with the indicator used in the embodiment shown in Fig. 1, revealed that the maximum amplitude of oscillation decreased to ½ its value in twenty five oscillations.

The decrease in the maximum amplitude with time follows this equation:

$$A_t = A_0 e^{-ut}$$

where $A_0$ is the swing at zero time
$A_t$ is the swing after a time $t$
$u$ is a constant to be determined.

In a time $t=25T$, where T is the period or time for 1 oscillation, the amplitude decreased 50 percent.

Therefore $$\frac{A}{A_0} = \frac{1}{2} = e^{-u25T}$$

$$\text{Log}_e \frac{1}{2} = -u25T$$

and $$u = \frac{0.7}{25T}$$

Substituting in the original equation $$A_t = A_0 e^{(.7/25T)t}$$

To find how much the swing decreased for one oscillation (for a time $t=T$)

$$A_T = A_0 e^{(.7/25T)T} = A_0 e^{-.7/25}$$

$$\frac{dA}{A} = \frac{A_0 - A_T}{A_0} = 1 - \frac{A_T}{A_0} = 1 - e^{-.7/25}$$

since $$e^{-.7/25} = 1 - 0.7/25 + \frac{1}{2}\left(\frac{-0.7}{25}\right)^2 \cdots$$

as an approximation $$e^{-.7/25} = 1 - 0.7/25$$

and $$\frac{dA}{A} = \frac{0.7}{25}$$

With the indicator having the losses as described above, and its period tuned so that the impulses occurred within approximately 45° before or after the rest period, satisfactory operation was obtained. That is, the motion was smooth, exact and of sufficient swing to be used as a reference member. To determine how close the period of the indicator has to be made to that of the impulses to obtain this satisfactory operation we proceed as follows:

Since $$dt = -\frac{dA}{wA} \tan \theta$$

Assume $$\theta = 45°$$

Therefore $$dt = -\frac{dA}{A} \cdot \frac{T}{2\pi} \tan 45°$$

$$\frac{dt}{T} = -(0.7/25)\left(\frac{1}{6.28}\right)1 = 0.00445 = 0.5\% \text{ approx.}$$

This corresponds to ±7 minutes a day. Thus the indicator would only have to maintain its period within these limits to give satisfactory performance. The effects of temperature upon the period of the indicator is well within these limits, even though no care was given to the materials used in its construction.

The oscillating system can also be analysed in a general way from an electrical analogy.

Figure 17:
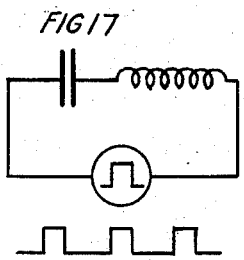
Fig. 17 shows an analogous electrical circuit for the oscillating system shown in Fig. 10.

The analogous electrical circuit for a mechanical system such as shown in Fig. 7 is shown in Fig. 17.

Figure 18:
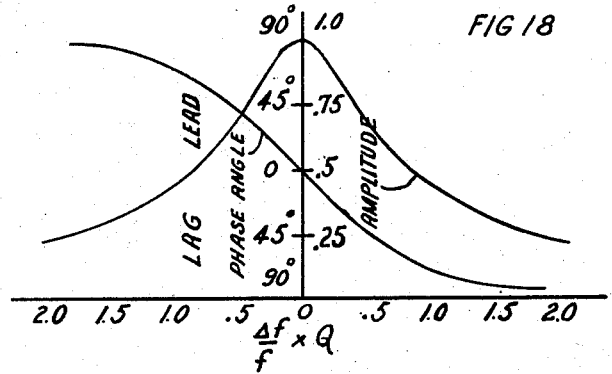
Fig. 18 is a chart showing how the amplitude of current, shown in Fig. 17, and its phase vary when the period between the pulses of current changes slightly from the natural period of the circuit, shown in Fig. 17.

The electrical solution for a circuit such as this is quite well known and Fig. 18 is a chart showing how the amplitude of the current (which in the mechanical system corresponds to the velocity of the pointer) varies as the applied frequency is changed $\Delta f/f$ above and below the resonant frequency. This chart is known as the "Universal Selectivity Chart" for a tuned circuit.

Some properties of this circuit are: firstly, the circuit presents a very low impedance to the generator at the resonant frequency or close to it and a high impedance to a frequency far off resonance; and secondly, the phase angle between the applied voltage and current is zero at resonance and is positive below resonance and negative above it.

Now the pulses of current fed to the moving coil of the indicator are exactly the same each pulse and are separated by an exact time interval. It is known that such a wave can be analysed mathematically by a Fourier series to consist of a direct current term, a fundamental frequency term whose period is the same as the time interval between the pulses, and harmonic terms which are multiples of the fundamental frequency. The amplitude and phase of each of these component terms are a function of the shape of the pulse. However, since we are applying these pulses to a tuned circuit, which presents a low impedance to the fundamental frequency and a very high impedance to the harmonics, the current which flows will be that of the fundamental frequency. Therefore, we need consider only the fundamental frequency.

Now when a sinusoidal voltage is applied to an electrical circuit as shown in Fig. 17 the current which flows is initially composed of two parts. The first part, which is a transient, is a current whose frequency is that of the natural period of the condenser and coil. This part dies away with time. The second part is known as the steady state current and its frequency is exactly that of the applied voltage.

From this analysis it can be seen that the steady state velocity and also amplitude of the mass 78 will have the exact frequency of the applied pulses. Also the motion will be a very smooth sinusoidal motion because of the selectivity characteristic of a tuned circuit.

It can also be realized that small variations in the pulses will have a very small effect on the motion, since it takes about fifty or sixty pulses to bring the body up to full oscillation, hence each pulse contributes about 1/60 to the energy being stored and released by the system's motion.

The selectivity characteristic of a tuned electrical circuit follows the well known equation $$\frac{\Delta f}{f} = \frac{1}{2Q} \tan \theta$$

where $\Delta f$ = change in frequency from the resonant frequency $f_0$ = the resonant frequency $\frac{Q}{2\pi}$ is the ratio of the energy stored per cycle to the energy lost per cycle.

The equation $$\frac{\Delta f}{f} = \frac{1}{2Q} \tan \theta$$

is very similar to that derived previously. The term $dA/A$ bears a relationship to the ratio of energy dissipated to that stored per cycle, for at the equilibrium condition the energy gained per cycle is equal to that dissipated.

The energy stored per cycle is $$E = \frac{1}{2} K A^2$$

where

K is the spring constant
E is the energy stored per cycle differentiating $$dE = K A dA$$

$$\frac{dE}{E} = 2 \frac{dA}{A}$$

The energy lost per cycle.
Therefore $$\frac{2\pi}{Q} = \frac{dE}{E} = 2 \frac{dA}{A}$$

and thus $$\frac{\Delta f}{f} = \frac{1}{2} \frac{dA}{\pi A} \tan \theta$$

hence $$-\frac{dt}{T} = \frac{1}{2} \frac{dA}{\pi A} \tan \theta$$

$$-dt = \frac{dA}{wA} \tan \theta$$

The same equation derived previously.

Figure 19:
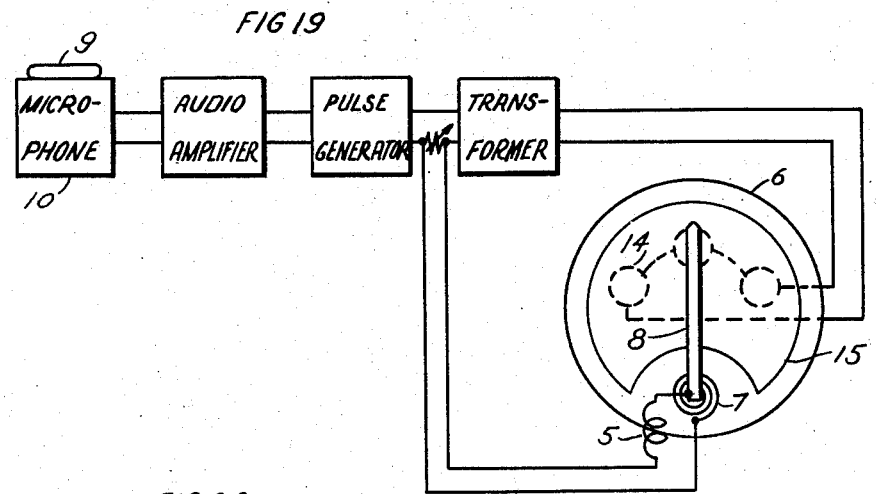
Fig. 19 is a schematic diagram of an apparatus illustrating another embodiment of the invention.
Figure 20:
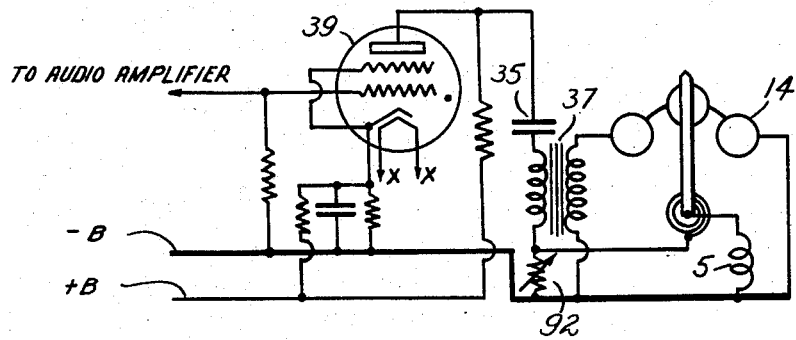
Fig. 20 is a circuit diagram for a portion of the embodiment shown in Fig. 19.

Another embodiment of the invention is shown in Fig. 19 and its electrical circuit is illustrated in Fig. 20.

In this method pulses of current controlled by the test watch 9 are sent through the moving coil 5 of the indicator 6 and at the same time these pulses cause the neon bulbs 14 behind a translucent scale 15 to flash.

The watch 9 is placed on the crystal microphone 10 and the electrical voltage caused by the ticks is amplified and it then triggers the thyratron tube 39. The capacitor 35 discharges through the primary of the transformer 37 and also the moving coil 5 shunted by resistor 92.

For the reasons explained previously the indicator pointer 8 will assume the exact frequency of these pulses. The neon bulbs 14 also will flash with this same period. Therefore, the image of the pointer 8 will appear stationary. As explained, the pointer 8 will lock in with the frequency of the applied pulses when the pulse occurs at such an angle $\theta$, the lengthening or shortening of the natural period of the indicator is just sufficient to make it exactly equal to the period of the applied pulses. This angle is given by the equation:

$$dt = -\frac{dA}{wA} \tan \theta$$

where $dt$ represents the difference in period between the indicator pointer 8 and the applied pulses.

Employing the indicator previously mentioned this equation becomes:

$$\frac{dt}{T} = (0.7/25)\left(\frac{1}{2\pi}\right) \tan \theta$$

The angle can easily be read to 0.03 radian.
Thus $$\frac{dt}{T} = (.7/25)\left(\frac{1}{6.28}\right)(.03) = 0.00014 \text{ approx.}$$

and $$0.00014 \times 1440 \text{ minutes/day} = 0.2 \text{ minutes/day}$$

This accuracy was obtained with an indicator which took 25 oscillations to fall to ½ its value. Indicators which take more than 25 oscillations to fall to ½ their amplitude can be made, and corresponding increases in sensitivity result.

If a pendulum is used it will take much longer than 25 oscillations for the amplitude to fall to ½ its value. Also, if the pointer oscillating system is enclosed in a partial vacuum the sensitivity will be increased.

When such systems which have very low energy losses per cycle are used, it may become critical to adjust the test watch to have a period close enough to the period of the indicator, to make the amplitude of the indicator build up. It is therefore desirable to have a means for varying the energy losses in the system. A variable resistor 92 is placed across the moving coil 5 of the indicator 6. When high losses and low sensitivity are desired, the resistor 92 is made to have a low value, and when high sensitivity and low losses are desired, it is made to have a high value.

The device can be operated in two ways; firstly, the system such as a pendulum or indicator is built to be an accurate time standard. The test watch 9 is placed on the microphone 10. If the watch is too far off, the pointer 8 will not build up. The sensitivity can be reduced by reducing the value of resistor 92 if necessary and the test watch 9 adjusted until amplitude of swing does build up. As the test watch 9 is adjusted closer to the standard frequency of the indicator the sensitivity can be increased to a maximum by increasing the value of resistor 92. The image of the pointer 8 will appear to the right or left of the the zero position. The number of degrees it is off from the center position can be calibrated by calculation from the equation $$t\frac{dt}{T} = -\frac{dA}{A 2\pi} \tan \theta$$

to give the number of seconds a day the watch 9 is fast or slow depending on which side of the center position the image is. Since the motion of the pointer 8 will not be affected by the tick and the tock of the watch, but the lights 14 will, the image will be seen to jump back and forth. This indicates the "beat" of the watch. To adjust the test watch as close to the standard frequency as possible, it is adjusted until the images due to the tick and tock fall equally, one to the right and one to the left of the center position. If this is not desired the indicator can be tuned to alternate ticks of the watch and the free running period of the thyratron tube 39 can be adjusted to be slightly lower than ½ the period of the alternate ticks and the strength of the voltage caused by the ticks of the test watch adjusted to make the pulses of current respond and lights 14 flash to alternate ticks. Thus the image will be very steady since the period of alternate ticks of a watch do not vary much.

In the second method of use, the indicator 6 is not made of material to provide an accurate time standard, but as before it is tuned close to the standard period. A standard watch 1 is placed on the microphone 10 and the period of the indicator 6 is adjusted, by tilting it up or down from the level position. Since the pointer 8 is not counter balanced, in one case the force of gravity will aid the spring restoring force and shorten the period and in the other case it will subtract from restoring force of the spring 7 and lengthen the period. By this simple means, the period of the meter is adjusted until the image of the poiner appears exactly on the zero position. The test watch 9 is then placed on the microphone 10 and if it is fast the image will appear to be at an angle to one side and if slow it will appear on the other side. As before the number of minutes a day the watch is off is calculated or calibrated from the equation $$\frac{dt}{T} = -\frac{dA}{2\pi A} \tan \theta$$

where $dA/A$ is determined from indicator by finding the time $t$ it takes the amplitude to fall to ½ its value as previously illustrated.

In Fig. 4 if switch 50 is thrown to the position 51 and attenuator 18 is reduced to zero the test watch 9 will cause the neon bulbs to flash. The same test watch 9 will also cause the thyratron tube 19 to discharge since the grid of this tube is connected to the grid of the thyratron tube 39 through resistor 52. Thus by throwing switch 50 it is possible to use the equipment in Fig. 4 for the embodiment just described. Moreover, if desirable, the lights 14 can be made to flash with multiples or submultiples of the watch 9 ticks and the pulses also can be made to respond to multiples or submultiples of the test watch 9 ticks, each independently by adjusting the circuit constants for each tube separately.

Figure 21:
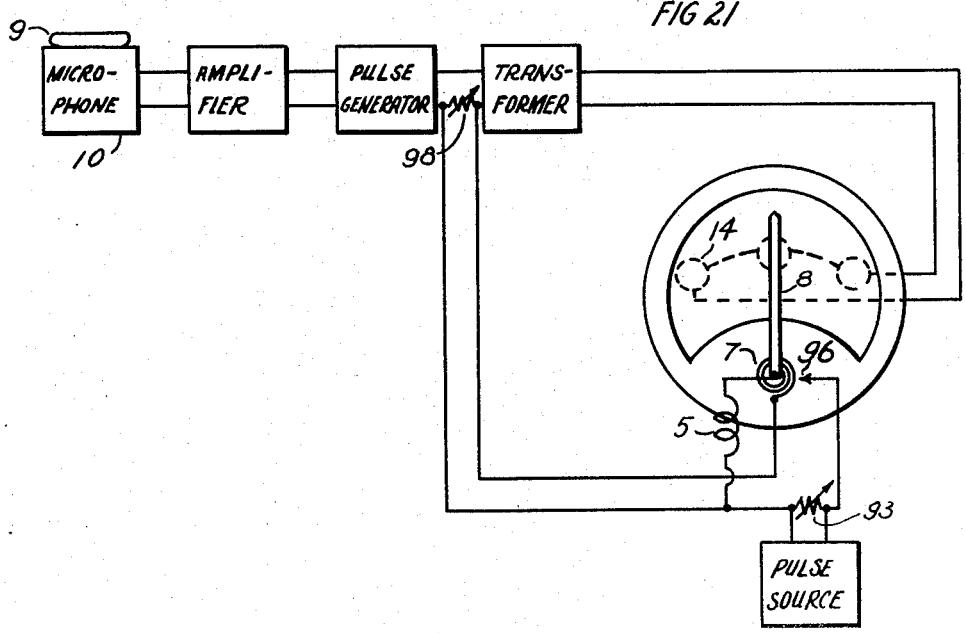
Fig. 21 is a schematic diagram of an apparatus illustrating another embodiment of the invention.
Figure 22:
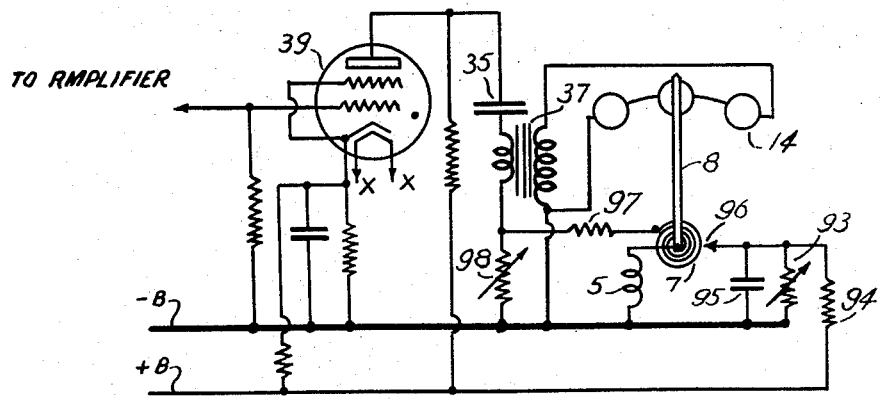
Fig. 22 is a circuit diagram for a portion of the embodiment shown in Fig. 21.

Another embodiment of this invention is shown in Fig. 21 and Fig. 22.

The sensitivity of the previous method can be increased by making the amplitude of vibration partially independent of the pulses of current controlled by the watch 9 ticks. This is done by making the system self oscillatory. In Fig. 22 as the pointer 8 passes the zero position and goes counter clockwise the hair-spring 7 expands and touches the contact point 96 thereby discharging the capacitor 95 through the moving coil 5. This gives the pointer 8 an impulse in a direction such that it sustains the motion. Resistor 94 prevents the +B voltage from passing very much current through the moving coil 5. Resistors 94 and 93 provide varying voltage to the charging of the capacitor 95 thereby controlling the strength of these impulses. As the pointer passes the equilibrium position again, but going in the opposite direction, the contact 96 is broken and the capacitor 95 charges up again. Thus the pointer will oscillate by itself and receive these impulses exactly at the zero position and thus these impulses will not shorten or lengthen the period of the indicator but only increases the amplitude of oscillation.

Pulses of current controlled by the watch 9 are also fed to the moving coil 5 of the indicator 6. In Fig. 22 resistors 98 and 97 are a series shunt combination for varying the strength of the pulses of current which go through the moving coil 5. The amplified voltages caused by the ticks of the watch 9 triggers the thyratron tube 39. Capacitor 35 discharges through the primary of the step up transformer 37, the tube 39 and the moving coil 5 of the indicator shunted by resistor combination 98 and 97. Thus the neon lights 14 are also caused to flash in synchronism with the ticks of the watch 9. The direction of these pulses of current through the moving coil 5 of the indicator are opposite to those caused by the discharge of condenser 95.

The theory of operation is as follows: The resistor 93 is adjusted to zero value so that the meter does not oscillate by itself. The resistor 98 is adjusted so that the pulses of current caused by the ticks of the watch 9 are fed to the moving coil 5. At this point the operation and analysis is exactly as that presented for Fig. 19. The oscillation will build up if the period of watch 9 is close to that of the indicator 6 and the image of the pointer 8 as seen in front of a translucent scale 15 as it is illuminated by the flashes of the neon bulbs 14 behind the scale, will be stationary and either be to the right or left of center, indicating if the watch is slow or fast. The amount the watch is slow or fast is determined by the equation $$\frac{dt}{T} = -\frac{dv}{wA} \sin \theta$$

In this equation if the value of $dv/WA$ is made smaller $\sin \theta$ will have to be larger to indicate the same difference in period between the test watch and the indicator represented by $dt/T$. This effectively increases the sensitivity of the indicator.

The amplitude of oscillation A is increased without increasing $dv$, the impulse controlled by the ticks of test watch. This is done by increasing the value of resistor 93 thereby allowing capacitor 95 to receive voltage and discharge it through the moving coil 5 of the indicator. Since the pointer 8 is oscillating in a direction such that the pulses controlled by the watch 9 are aiding it, the hairspring 7 will be contracting when these pulses are going through the moving coil 5.

The pulses of current coming from capacitor 95 occur when the pointer is going in the opposite direction a half cycle later when the hairspring 7 expands and makes contact. This pulse of current is in such a direction as to maintain the oscillation and hence increase the amplitude of oscillation.

To increase the sensitivity resistor 98 is decreased and resistor 93 increased, thereby making $dv$ the impulse controlled by the watch 9 small and A the maximum swing of oscillation larger.

In operation, if the test watch is far off from being in time with the standard system, the equation $$\frac{dt}{T} = -\frac{dv}{wA} \sin \theta$$

cannot be satisfied if $dt/T$ is greater than $dv/wA$. Hence resistor 93 is set at a minimum value to start.

If the test watch is adjusted to be close in time to that of the indicator 6, $dv$, the impulse can be decreased by reducing the value of resistor 98, A, the maximum amplitude of oscillation, can be increased or maintained by increasing resistor 93. The sensitivity of the indicator is increased and allows the period of test watch 9 to be adjusted closer to that of the indicator.

Attenuators 98 and 93 can be calibrated and these in conjunction with angle $\theta$ and the equation $$\frac{dt}{T} = \frac{dv}{wA} \sin \theta$$

give the number of seconds a watch is off in one day.

If the resistor 93 is increased and 98 is reduced to zero, another embodiment of the invention results. In this case the indicator is oscillating at its own natural frequency which can be made to be a primary standard. The motion of the indicator pointer 8 is observed by the flashing neon bulbs, which are under control of the test watch 9. When the period of the test watch 9 is the same as that of the indicator 6 the image will be stationary. If it is slow or fast the image will drift back and forth with a speed which is determined by the amount the period of the test watch is different from that of the standard period of the indicator. The normal period of oscillation of the thyratron tube 39 and the lights 14 are adjusted to be about 1½ hours a day slower than the standard frequency. Hence as before in Fig. 4, the test watch is determined to be fast or slow by allowing the lights 14 to assume their normal frequency of flashing. If the image advances in the same direction it was moving, the test watch is slow, if it reverses it is fast.

Figure 23:
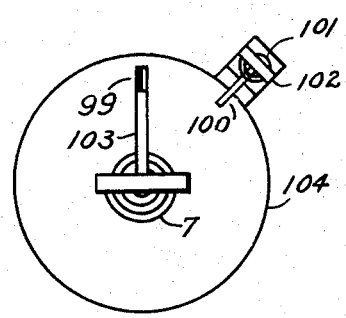
Fig. 23 is a view of an apparatus of another embodiment of the invention.
Figure 24:
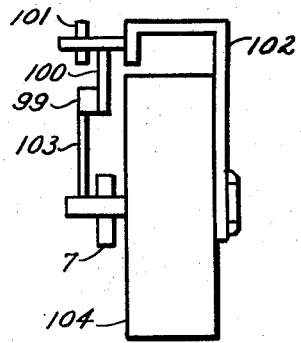
Fig. 24 is a side view of Fig. 23.
Figure 25:
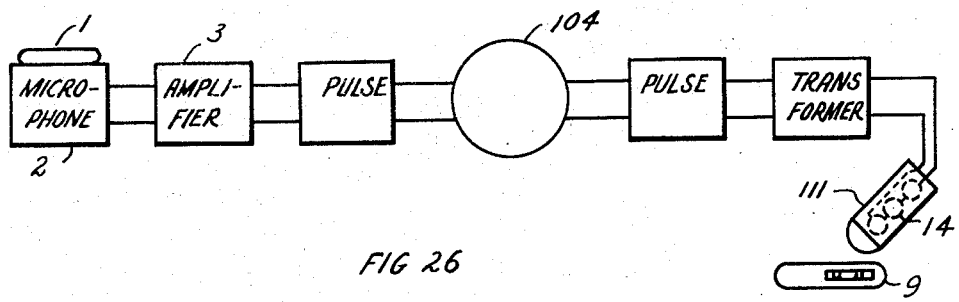
Fig. 25 is a schematic diagram for the embodiment illustrated in Fig. 23.

In Fig. 25 is shown diagrammatically another application of the invention. The standard watch 1 is placed on the microphone 2 and the resultant pulses of current caused by the watch ticks are fed to the moving coil of the meter 104 shown in Fig. 26. The frequency of these pulses are the same as the ticks of the standard watch and, therefore, the pointer 103 of the indicator will oscillate very smoothly back and forth at this frequency. Refer to Fig. 23 and Fig. 24. On the pointer 103 is a contact 99. The contact is composed of two parts fastened together. One part is insulating material and the other part is metal.

Thus as the pointer 103 oscillates the contact 99 will make electrical contact when it is going in the clockwise direction, but will not make contact when it is going counter clockwise. The hairspring contact 100 is a short piece of metal pivoted on the arm 102 and also fastened to the center of the hairspring 101. The outer end of the hairspring is fastened to the arm 102. Normally the contact is pointed toward the pivot of the pointer 103 but when the contact 99 strikes it, it revolves in its pivot turning the hairspring 101 and allows the contact 99 to pass. After the contact 99 passes, the hairspring restores the contact 100 to its normal position. The hairspring 101 is very weak so that it will not disturb motion of the pointer 103 very much and enough friction is introduced at the pivot of the contact 100 to prevent it from oscillating with its hairspring 101.

Thus an electrical contact is made for each cycle of oscillation and since there is one cycle to each tick of the standard watch there will be an electrical contact for each tick of the standard watch. It is noted that any difference in the tick and tock of the standard watch will not be present in the period of the electrical contacts made by the pointer since the motion of the pointer 103 averages these variations out.

These electrical contacts cause a thyratron tube to discharge a pulse of current from a capacitor through the primary of a step up transformer 37. The high voltage across the secondary causes the neon bulbs within the housing 111 to flash. The movement of the balance wheel and parts within the test watch 9 are viewed with these flashes of light.

Figure 26:
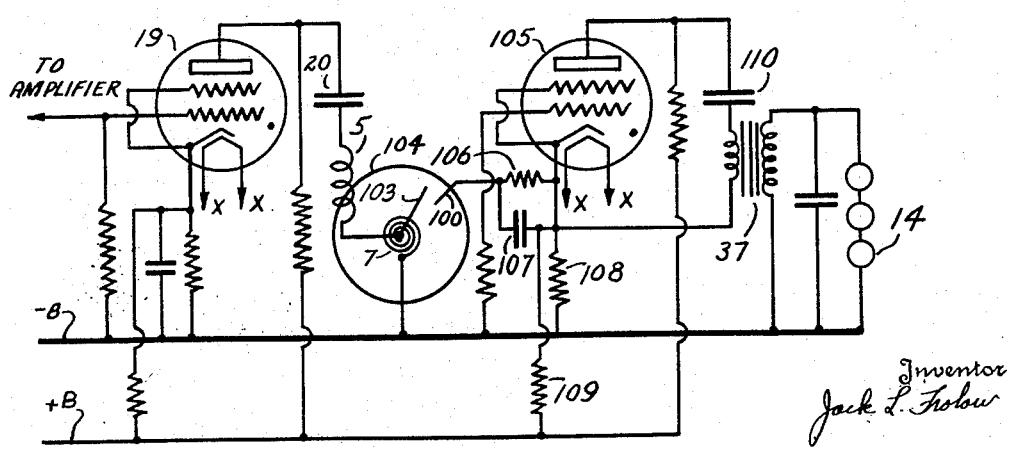
Fig. 26 is an electrical circuit for a portion of the embodiment illustrated in Fig. 25.

In Fig. 26 is shown the electrical circuit for a portion of the diagram in Fig. 25. Cathode bias is provided to the cathode of tube 105, a thyratron such as a type 2050, by the +B voltage through resistors 108 and 109. When pin 100 makes contact with the pointer contact 99 the bias is reduced to zero momentarily until capacitor 107 charges up through resistor 108. This effectively provides a sharp positive voltage between the cathode and grid of tube 105 causing it to conduct and the capacitor 110 discharge through the primary of the step up transformer 37. A sharp high voltage appears across the secondary of this transformer and flashes the neon bulbs 14 in the housing 111. Resistor 106 allows the capacitor 107 to discharge when the contact between 99 and 100 is open.

Since thereare two ticks to each oscillation of the balance wheel of a watch there will be two flashes to each oscillation and hence there will be two images of the balance wheel. These images will be stationary if the test watch is of the same rate as the standard watch. Their position will be farthest apart if at the instant the flash occurs the balance wheel is at its maximum swing. If the time at which these flashes occur is charged but the interval of time between them is kept the same, the two images of the balance wheel will move closer and closer together until the flashes occur exactly when the balance wheel is passing through its zero amplitude position and then the two images merge into one.

For it is at this point that the flashes will catch the balance wheel first going in one direction and then in the opposite direction at the same position.

The time the flashes occur is varied by rotating the arm 102 about the meter 104 until one image is observed of the test watch balance wheel. If the test watch is not in time with the standard watch, this single image will drift into two images. If it takes 1 minute for the single image to drift into two images separated approximately by 7.2° which will be discernible by a flickering in the image of the balance wheel, the test watch is in error by 6 second a day. This difference in timing is calculated as follows:

If the amplitude of oscillation of the test watch balance wheel is 90°, the balance wheel has an error of 3.6°/360° of a cycle per min. or .01 cycle per minute. In one day there are 1440 minutes and .01 cycle per minute corresponds to 14.4 cycles per day. Since there are 2½ cycles per second or 150 cycles per minute, 144 cycles per day corresponds to 0.1 minute per day.

If longer periods of time are used to observe the test watch corresponding increases in the detectable error result.

The method of observing the balance wheel described above is very similar to that described in Patent 2,322,861 titled "Constant Speed Body."

However, the constant speed body has been replaced by a simpler and more economical oscillating body, and instead of using a fixed lens system for obtaining the flashes of light, a more flexible and economical electrical system is used.

It is also possible to have the meter oscillate at ½ the frequency of the standard watch ticks. This will provide but one image of the balance wheel. The difference in timing would be noticed by a drift of this image with respect to a fixed member of the test watch. This single image would allow the watch parts to be observed in various parts of their cycle while they were in motion.

It is still possible to have two images of the balance wheel while the meter is oscillating at ½ the standard watch ticks using two contact arms such as 102. However, the angle formed between the two arms must always be centered exactly about the zero position of the pointer 103. This would provide two electrical contacts for each oscillation and would further provide that they would be 180° apart or ½ the period of the pointer's, oscillation.

Another application of this invention is presented in Fig. 27. The standard watch 1 is placed on the microphone 2 and the pulses of current triggered by the amplified voltages caused by the watch ticks are fed to the coil of the delay device 112. The electrical circuit is shown in Fig. 28. Capacitor 20 discharges through the thyratron 19 and the coil 117 every time a watch tick causes the grid of the thyratron to be driven positive. The armature 116 and spring 118 are chosen so that their period of oscillation is greater than the period of the watch ticks. Thus the time it takes the armature 116 to reach full deflection and return to its rest position will be greater than half the period of the watch ticks. When the armature 116 hits the contact pin 114 capacitor 119 charges up through the resistor 113 to about ⅔ of the +B voltage in .01 second (the time of contact). When the armature returns and strikes the rest position pin 115 it discharges through the primary of the transformer 37. A high voltage appears across the secondary of the transformer which causes the neon bulbs 14 or other bright gaseous discharge tubes in the housing 111 to flash.

By varying the position of the contact pin 114, the time it takes for the armature to strike the pin 114 and return to its rest position is varied. Thus the flash of the bulb can be made to lag the standard watch ticks from zero to more than half the period of the watch ticks, yet the time interval between the flashes will be the same.

The light from the housing 111 can be focused on the balance wheel of the test watch and the time rate of the test watch can be analyzed exactly as that presented for Fig. 25.

It is understood that minor changes may be made in the devices of the invention without departing from the spirit of the invention and the scope of the appended claims.

What is claimed is:

1. A timing device of the character described comprising a system responsive to a single impulse to oscillate between two extreme positions a plurality of cycles having an integral relation with a predetermined frequency; means for producing impulses controlled by the rate of a timepiece, said rate being independent of said system and having substantially said predetermined frequency; means for driving said system by said impulses; and means for indicating the position of said system in its oscillation, at the instants said driving impulses occur, thereby indicating the amount lower or higher the frequency of said driving impulses differs from the said predetermined frequency.

2. A timing device of the character described comprising a system responsive to a single impulse to oscillate a plurality of cycles between two extreme positions at a frequency having an integral relation with a predetermined frequency; means for driving said system by periodic impulses having a frequency independent of said system, said periodic impulses having substantially said predetermined frequency; and means for indicating the time phase between said periodic impulses and the oscillation of said system, thereby indicating the amount higher or lower the said driving frequency differs from said predetermined frequency.

3. A time apparatus for rating periodic impulses comprising means for producing oscillatory movement of a member between two extreme positions at a frequency having an integral relation with a predetermined frequency; means for driving said member by periodic impulses having substantially said predetermined frequency and having an amplitude of sufficient magnitude to cause said member to oscillate at a frequency having exactly an integral relation with the frequency of said driving impulses; means for indicating the position of said member at the instant said driving impulse occurs thereby indicating the amount quantitatively the frequency of the said periodic driving impulses differs from the said predetermined frequency.

4. In a timing device for rating periodic impulses a system responsive to a single impulse to oscillate a plurality of cycles between two extreme positions at a natural frequency; means for maintaining said system in oscillation by a first series of impulses having a frequency controlled by the frequency of oscillation of said system; means for driving said system by a second series of periodic driving impulses, the natural frequency of said system having substantially an integral relation with the frequency of said second series of driving impulses, and the frequency of said second series of driving impulses being independent of said system; and means actuated by said second series of driving impulses for indicating the position of a member in its oscillation of said system at the instants said second series of impules occur, thereby indicating the amount higher or lower the frequency of the second series of driving impulses differs from the natural frequency of said system.

5. Apparatus of the character described for providing a reference member for a timing device comprising a system responsive to a single impulse to oscillate between two extreme positions a plurality of cycles with a natural frequency having a fixed relation to a predetermined frequency; means for producing a first series of periodic impulses having a frequency independent of said system, said periodic impulses having substantially said predetermined frequency; means for producing a second series of periodic impulses having a frequency controlled by the frequency of oscillation of said system; means for driving said system by both said first series and said second series of periodic impulses; and means for indicating the position of said system in its oscillation at the instants said first series of periodic impulses occur, thereby indicating the amount higher or lower the frequency of the said first series of periodic impulses differs from the said natural frequency of said system.

6. Apparatus as described in claim 5 and in addition means for adjusting individually the strength of said first series and said second series of periodic impulses to any desired value including zero.

7. Apparatus of the character described for providing a reference member for a timing device comprising a system responsive to a single impulse to oscillate between two extreme positions a plurality of cycles with a natural frequency having a fixed relation to a predetermined frequency; means for driving said system by a first series of periodic impulses having a frequency controlled by the frequency of oscillation of said system; means for driving said system by a second series of impulses having a frequency independent of said system and having substantially said predetermined frequency; and means for indicating the position of said system in its oscillation at the instants said first series of periodic impulses occur, thereby indicating the amount higher or lower the frequency of the said first series of periodic impulses differs from the natural frequency of said system.

8. Apparatus of the character described for providing a reference member for a timing device comprising a system responsive to a single impulse to oscillate between two extreme positions a plurality of cycles with a natural frequency having a fixed relation to a predetermined frequency; means for driving said system by a first series of periodic impulses having a frequency independent of said system, said periodic impulses having substantially said predetermined frequency; means for driving said system by a second series of periodic impulses having a frequency controlled by the frequency of oscillation of said system; means for adjusting individually the strength of said first series and said second series of periodic impulses to any desired value including zero; and means for indicating the position of said system in its oscillation at the instants said first series of periodic impulses occur, thereby indicating the amount higher or lower the frequency of the said first series of periodic impulses differs from the natural frequency of said system.

References Cited in the file of this patent

UNITED STATES PATENTS

| | | |
|---|---|---|
| 2,425,165 | Usselman | Aug. 5, 1947 |
| 2,426,602 | Edgerton | Sept. 2, 1947 |
| 2,437,929 | Bennett | Mar. 16, 1948 |
| 2,564,636 | Bennett et al. | Aug. 14, 1951 |
| 2,658,381 | Johnston et al. | Nov. 10, 1953 |
| 2,667,061 | Gibbs | Jan. 26, 1954 |
| 2,687,511 | Penniman | Aug. 24, 1954 |